United States Patent Office 3,000,893
Patented Sept. 19, 1961

3,000,893
METHYL O-PIPERONYLOYL-RESERPATE
Emil Schlittler, Madison, N.J., assignor to Ciba Pharmaceutical Products, Inc., Summit, N.J., a corporation of New Jersey
No Drawing. Filed Nov. 14, 1957, Ser. No. 696,315
1 Claim. (Cl. 260—287)

This application is a continuation-in-part of my copending application Serial No. 526,780, filed August 5, 1955, now U.S. Patent No. 2,824,874, issued February 25, 1958, which in turn is a continuation-in-part application of my application Serial No. 376,984, filed August 27, 1953 (now abandoned), which in turn is a continuation-in-part application of my application Serial No. 373,461, filed August 10, 1953 (now abandoned), which in turn is a continuation-in-part application of my application Serial No. 361,879, filed June 15, 1953 (now abandoned), which in turn is a continuation-in-part application of my application Serial No. 353,920, filed May 8, 1953 (now abandoned).

The invention relates to a new diester of reserpic acid and salts thereof, as well as the preparation of such compound.

From investigations I made jointly with J. Mueller and H. J. Bein, it is known that from Rauwolfia serpentina Benth, an alkaloid having sedative action can be isolated in pure form which is called reserpine [Experientia, volume VIII, page 338 (1952)]. Reserpine also has a pronounced hypotensive action and is of great therapeutic importance. The alkaloid itself and the process of its preparation are more thoroughly described in U.S. patent application Serial No. 367,357, filed July 10, 1953, now U.S. Patent No. 2,752,351, issued on June 26, 1956 to me and Johannes Mueller.

I have made the observation that when reserpine is treated with certain agents described below, a carboxylic acid is obtained, to which I have given the name reserpic acid. My investigations have shown that in addition to the free carboxyl group reserpic acid has a free hydroxyl group and can be represented by the formula:

$$\text{Res}\begin{matrix}\diagup \text{OH} \\ \diagdown \text{COOH}\end{matrix}$$

in which the radical "Res" stands for the divalent organic radical bound to the free hydroxyl and carboxyl groups in the reserpic acid.

Reserpic acid has the following physical characteristics: melting point: 239–245° C.; ultraviolet spectrum (in ethanol); mixima at $\lambda=224$ m$\mu$ ($\epsilon=31,000$), 270 m$\mu$ ($\epsilon=5,040$), 294 m$\mu$ ($\epsilon=6,520$); minima at $\lambda=250$ m$\mu$ ($\epsilon=3,440$), 280 m$\mu$ ($\epsilon=4,210$); infrared spectrum (in Nujol), absorption bands at 3520–3480 (incline), 3240 (broad band), 2900, 2850 (broad band), 1625, 1605–1585 (broad band), 1570, 1505, 1465, 1395, 1378, 1365, 1317, 1280, 1242, 1221 (flat), 1201, 1163, 1140, 1108, 1078, 1028, 973, 950, 905, 829, 804, 750, 720. The microanalysis gives the following values in percent: C=65.66; H=7.33; N=6.98; empirical formula:

$$C_{22}H_{28}O_5N_2$$

The radical "Res" in the above structural formula has, therefore, the empirical formula $C_{21}H_{26}O_2N_2$.

My investigations have further disclosed the fact that by conversion of the carboxyl group of reserpic acid into a carbomethoxy group, methyl reserpate (reserpic acid methyl ester), is formed having the formula,

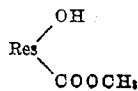

which can be converted into resrepine of the formula:

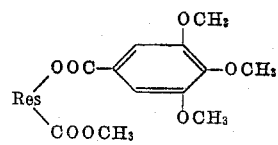

by esterification of the free hydroxyl group with 3,4,5-tri-methoxy-benzoic acid.

The present invention relates to the new methyl O-piperonyloyl-reserpate and the salts thereof. This diester has a pronounced sedative and hypotensive effect and can be used as a medicament. Thus, it can be used to lower the blood pressure in hypertensive conditions and is especially suitable in acute conditions, such as toxemia of pregnancy. Furthermore in states of anxiety and stress it calms the patient and makes him susceptible to psychiatric treatment.

The first stage of the process for the preparation of the methyl O-piperonyloyl-reserpate comprises subjecting reserpine to the action on an alkaline saponifying medium.

Depending on the procedure which is followed, it is possible to split both ester groups or to saponify reserpine partially, splitting but the esterified hydroxyl group. To achieve one or the other end, one may work with different alkaline saponifying agents or with the same but under different conditions, such as for example, in the presence or absence of water, at a lower or higher temperature or for a longer or shorter period of time. For example, when reserpine is heated for a comparatively long time with the solution of an alkali metal hydroxide, such as potassium hydroxide, in an alcohol, such as methanol, both ester groups are hydrolyzed. When the treatment is performed with the same agent under milder conditions, e.g. for a short reaction period, only the esterified hydroxyl group is split.

For partial saponification, however, reserpine is advantageously hydrolized with a saponifying agent capable of converting an esterified hydroxyl group into a free hydroxyl group with simultaneous reesterification of any hydrolized carboxyl group, which effect may be achieved by methanolysis. This procedure is described in application Serial No. 376,523, filed August 25, 1953, now U.S. Patent No. 2,786,844, issued March 26, 1957, to Harold B. MacPhillamy and Charles F. Huebner. According to this patent, it is of advantage to treat reserpine with anhydrous methanol in the presence of an alcoholate, such as an alkali metal methylate, e.g. sodium methylate, or aluminum tertiary butylate or some other alcoholyzing agent, such as sodium carbonate or piperidine, to form methyl reserpate. For conversion into reserpic acid, metheyl reserpate can be further treated in an alkaline medium, e.g. with an alcohol solution of an alkali metal hydroxide, such as a methanol solution of potassium hydroxide.

Methyl reserpate can also be obtained by treating reserpic acid or a salt thereof with an esterifying agent capable of converting a carboxyl group into a carbomethoxy group. To this end the reserpic acid can be converted into the methyl ester thereof either directly or by way of a functional derivative thereof. Advantageously reserpic acid is reacted with diazomethane or it is esterified with methanol in the presence of acid, such as a hydrohalic acid, e.g. hydrochloric acid.

To prepare methyl O-piperonyloyl-reserpate, methyl reserpate may be treated with piperonylic acid, advantageously in the form of a reactive functional derivative thereof, especially a halide, e.g. chloride, or an anhydride. The reaction is preferably conducted in the presence of a diluent and/or a condensing agent. When an acid halide is used it is recommended to work in an anhydrous solvent and in the presence of an acid-binding agent, such as an alkali metal or an alkaline earth metal carbonate e.g. sodium or calcium carbonate or potassium hydrogen carbonate, or a strong organic base, such as a tertiary amine e.g. pyridine, collidine and the like. There may be used, for example, an acid chloride in pyridine as a solvent.

Depending on the method of working, the new ester is obtained in the form of a base or as a salt thereof. A base can be converted into its therapeutically useful, non-toxic salts with acids, for example, by treatment with inorganic or organic acids, such as hydrohalic acids e.g. hydrochloric acid, sulfuric acid, phosphoric acid, nitric acid, hydroxyethane sulfonic acid, toluene sulfonic acid, acetic acid, tartaric acid, or citric acid. From the salts, the methyl O-piperonyloyl-reserpate can be obtained in the free form, for example, by reaction with silver carbonate. In the afore-described reactions, methyl reserpate used as the starting material may also be employed in the form of a salt, for example, as the hydrochloride.

The following examples will serve to illustrate the invention. The relationship of parts by weight to parts by volume being the same as the gram to the milliliter. Temperatures are given in degrees centigrade.

*Example 1*

One part by weight of reserpine is refluxed with 40 parts by volume of 1 N methanolic potassium hydroxide under nitrogen for 1½ hours. The solution is cooled, adjusted to pH 1–2 with 1:1 hydrochloric acid (6 N), and filtered to remove potassium chloride. The filtrate is evaporated almost to dryness, slurried with two 25 parts by volume portions of ether and partially dissolved in 25 parts by volume of methanol. The methanol is evaporated almost to dryness and the residue again extracted with two 25 parts by volume portions of ether. The solid remaining is dissolved in 50 parts by volume of methanol, adjusted with 1 N methanolic potassium hydroxide to about pH 6 and evaporated almost to dryness. Addition of 50 parts by volume of chloroform dissolves the bulk of the solid, leaving potassium chloride. Evaporation of the chloroform extract leaves crude reserpic acid which crystallizes on the addition of a small amount of methanol and warming in a water bath. Ether is added dropwise to complete the crystallization and the crystals filtered and washed with ether. The reserpic acid thus obtained in the form of the hydrochloric melts at 255–258°. It has the empirical formula: $C_{22}H_{28}O_5N_2 \cdot HCl$. The hydrochloride is very soluble in water, substantially insoluble in dry chloroform and moderately soluble in methanol-chloroform. It has optical rotations: $[\alpha]_D^{25}=-75°$ (1% $H_2O$) and $[\alpha]_D=-80\pm3°$ ($CHCl_3$). The compound analyzes as follows in percent: C=59.59; H=7.06; N=6.2; Cl=8.12; O=19.03 (by difference). The compound exhibits characteristic absorption bands in the infrared region of the spectrum when suspended in solid form in a hydrocarbon oil (Nujol) at the following frequencies expressed in reciprocal centimeters: 3450 (broad band), 3225, 2915 (broad band), 2858–2880 (flat), 2585 (broad band), 1685, 1630, 1605, 1578, 1511, 1482, 1465, 1450, 1405, 1370, 1350, 1335, 1310, 1290, 1265, 1250, 1230 1205, 1160, 1145, 1090, 1075, 1055, 1020, 980, 950, 900, 870, 840, 820, 780, 755, 712, 675 and 625.

In ethanol, reserpic acid hydrochloride exhibits absorption bands in the ultra-violet region of the spectrum having maxima at 222 m$\mu$($\epsilon$=33,330), 268 m$\mu$($\epsilon$=5150), 294 m$\mu$($\epsilon$=6776); and minima at 248 m$\mu$($\epsilon$=2942) and 278 m$\mu$($\epsilon$=4146).

Reserpic acid hydrochloride can be converted to the free acid as follows: 0.1 part by weight of reserpic acid hydrochloride is dissolved in 10 parts by volume of methanol and stirred with 0.125 part of powdered silver carbonate for 10 minutes. The solution is filtered to remove excess silver carbonate and the silver chloride formed, and the filtrate evaporated to dryness, whereupon a pale yellow solid is obtained. Recrystallization from 1–2 parts by volume of methanol yields almost colorless crystals of reserpic acid, M.P. 239–245°. Analysis: C=65.66, H=7.33, N=6.98, O=20.03 (by difference).

In ethanol the free reserpic acid exhibits absorption bands in the ultraviolet region of the spectrum having maxima at 224 m$\mu$($\epsilon$=31,000), 270 m$\mu$($\epsilon$=5,040), 294 m$\mu$($\epsilon$=6,520); and minima 250 m$\mu$($\epsilon$=3,440) and 280 m$\mu$($\epsilon$=4,210).

The free reserpic acid exhibits characteristic absorption bands in the infrared region of the spectrum when suspended in solid form in a hydrocarbon oil (Nujol) at the following frequencies expressed in reciprocal centimeters: 3520–3480 (incline), 3240 (broad band), 2900, 2850 (broad band), 1625, 1605–1585 (broad band), 1570, 1505, 1465, 1395, 1378, 1365, 1317, 1280, 1242, 1221 (flat), 1201, 1163, 1140, 1108, 1078, 1028, 973, 950, 905, 829, 804, 750, 720.

The reserpic acid can be converted to the hydrochloride as illustrated by the following example: 0.1 part by weight of reserpic acid is slurried in 5 parts by volume of methanol and the pH adjusted to 3–4 by adding several drops of 1:1 hydrochloric acid. The resulting solution is concentrated under reduced pressure to a small volume, whereupon white crystals are formed. After standing a few minutes, the crystals are filtered off. The reserpic acid hydrochloride thus obtained melts at 257–260°. The mother liquor, on standing, yields further crystals of reserpic acid hydrochloride.

The free reserpic acid may also be converted into metal salts, for example, the alkali metal salts, as illustrated by the following example: 0.1 part by weight of reserpic acid is mixed with 0.25 part by volume of 1 N methanolic potassium hydroxide. The solution thus obtained is filtered, and the filter washed with 1 part by volume of methanol. To the filtrate is added 25 parts by volume of ether, whereupon potassium reserpate precipitates as a white powder. The salt is collected on a filter and washed once with 5 parts by volume of ether and dried. The salt begins to char at above 200°, is black at 250°, and melts at 270–300°.

Alkaline earth metal salts, e.g. barium and calcium salts can be prepared in a similar manner by employing the appropriate alkaline earth metal bases.

The reserpine employed as the starting material in the above example may be prepared as described in the aforementioned U.S. patent application Serial No. 367,357, filed July 10, 1953, now U.S. Patent No. 2,752,351, issued on June 26, 1956 to me and Johannes Mueller. The following illustrates the process: 7,000 parts by weight of powdered bark obtained from the roots of Rauwolfia serpentina Berth are percolated with 35,000 parts by volume of methanol. After evaporating the methanol extract, 1,050 parts by weight of a dark colored powder are obtained, which is treated with water repeatedly. The remaining insoluble residue is then treated five times, each time with 1,500 parts by volume of 10% aqueous acetic acid and the solution separated from the oily portion by centrifugation. The brown acetic acid solution is either concentrated at low temperature or diluted with half of its volume of water and then has a pH of about 3.9. This solution is extracted with a total of 3,500 to 4,000 parts by volume of chloroform divided into 3 to 4 portions. The chloroform extracts are washed once with potassium carbonate solution and twice with water, then dried with sodium sulfate and completely evaporated in vacuum. The residue of 70 to 80 parts by weight is a green-brown colored powder. For further processing, this residue is dissolved in benzene and chromatographed on 1,000 to 1,200 parts by weight of neutral aluminum oxide (activity II—III according to the Brockmann standard). By eluting with benzene a small amount of a yellow oil is obtained first and afterwards 0.9 part by weight of a physiologically inactive crystalline material with an M.P. of 238–239° C. and then the sedatively active component follows. As soon as the main part of the active component is eluted, the chromatographic column is then further eluted with a mixture of 2 parts by volume of benzene and 1 part by volume of acetone. By doing so the remainder of the sedative principle is eluted and then physiologically inactive crystalline material with an M.P. 141–143° follows. The fractions which contain the sedative factor are evaporated to dryness. By recrystallizing the residue from hot acetone or a mixture of chloroform and ether, 6.5 to 7 parts by weight of residue (reserpine) are obtained in almost colorless crystals melting at 262–263° (with decomposition) and with a rotation $[\alpha]_D = -117°$ (chloroform).

*Example 2*

To a suspension of 1.2 parts by weight of reserpic acid hydrochloride in 50 parts by volume of 50% ether-methanol is added an axcess of an ether solution of diazomethane. Nitrogen is evolved and most of the material gradually goes into solution. The reaction mixture is allowed to stand about 18 hours at room temperature and then excess diazomethane is removed by distillation. The resulting solution is filtered and concentrated to dryness under reduced pressure at not over 40° C. The crystalline residue is recrystallized from methanol-ether solution and yields methyl reserpate, M.P. 240–242°. It has the empirical formula $C_{23}H_{30}O_5N_2$ and analyzes in percent as follows: C=66.68; H=7.34; N=7.06; O=18.92 (by difference), $[\alpha]_D - 101 \pm 3°$ (CHCl$_3$). The compound is insoluble in water, soluble in methanol, ethanol and chloroform. In ethanol, it exhibits absorption bands in the ultraviolet region of the spectrum having maxima at 226 m$\mu$ ($\epsilon$=33,830), 270 m$\mu$ ($\epsilon$=5,090), 298 m$\mu$ ($\epsilon$=6,080); and minima at 252–4 m$\mu$ ($\epsilon$=4,110) and 282 m$\mu$ ($\epsilon$=4,070). The compound exhibits characteristic absorption bands in the infrared region of the spectrum when suspended in solid from in a hydrocarbon oil (Nujol) at the following frequencies expressed in reciprocal centimeters: 3510, 3365, 2850–2950 (broad band), 1724, 1632, 1578, 1500, 1465, 1380, 1362, 1355, 1340, 1332, 1312, 1298, 1268, 1245, 1225, 1202 1155, 1088, 1068, 1055, 1040, 1030, 1020, 1008, 970, 940, 912, 890, 860, 848, 835, 785, 770, 753, 720, 710, 655 and 625.

*Example 3*

To 50 parts by volume of anhydrous methanol is added 0.1 part by weight of metallic sodium and when the ensuing reaction has ceased, 1.0 part by weight of reserpine is suspended in the solution. The mixture is refluxed for three hours during which time the material gradually dissolves. The solution is then concentrated under reduced pressure at 40–50° to about 15 parts by volume and 50 parts by volume of water are then added. The pH of the solution is adjusted to 4.5–5 by the addition of 10% sulfuric acid. The resulting acid solution is extracted three times with 50 parts by volume portions of ether. The aqueous phase is then made alkaline with concentrated ammonia and the precipitated material taken up in chloroform. The chloroform solution is washed with water, dried and the solvent removed. The resulting oil crystallizes and is identified as methyl reserpate.

*Example 4*

2 parts by weight of methyl reserpate and 6.5 parts by weight of piperonyloyl chloride are dissolved in 25 parts by volume of dry pyridine and allowed to stand at 5° for two weeks. The semi-crystalline mixture is poured over an equal quantity of ice and the resulting solution evaporated almost to dryness under reduced pressure at 50°. After repeated evaporation from chloroform, the residue is dissolved in 125 parts by volume of chloroform and washed with 2 percent aqueous sodium hydroxide and water. The chloroform is dried over sodium sulfate, evaporated under reduced pressure and the residue chromatographed in benzene on neutral alumina (Woelm, activity I). Benzene containing increasing amounts of methanol (0.5–5 percent) elutes a gum, which crystallizes from ethanol-methylene chloride. The thus obtained methyl O-piperonyloyl-reserpate melts at 235–239°. Its infrared spectrum (taken in Nujol, a mineral oil) shows the following bands given in reciprocal centimeters: strong bands at 2893–2858, 1733, 1714, 1468, 1445, 1288, 1265, 1241, 1156, 1115, 1110, 1045, 762; medium bands at 3373, 1629, 1510, 1491, 1374, 1338, 1312, 1200, 1183, 1075, 922, 891; medium bands at 989, 978, 939, 880, 834, 826, 808, 788, 720; weak bands at 3076, 1575, 953, 863 849; shoulders at 1610, 1363, 1330, 1227, 1215, 1035, 1016, 971, 744, 731.

The base may be converted into its salts, for example as follows: 0.02 part by weight of methyl O-piperonyloyl-reserpate in 1.5 parts by volume of ethanol is treated with a small amount of dilute nitric acid (1:5) yielding the crystalline nitric acid salt of methyl O-piperonyloyl-reserpate which after filtering, washing with water and drying, melts at 231–234°.

0.02 part by weight of methyl O-piperonyloyl-reserpate in 1.5 parts by volume of 20 percent acetic acid is treated with an excess solid oxalic acid. The gelatinous precipitate which forms immediately is transformed to a grainy white powder by warming and triturating on the steam bath. It is filtered, washed with a small amount of 10 percent acetic acid and with ether. The thus obtained oxalic acid salt of methyl O-piperonyloyl-reserpate melts after drying at 238–240°.

*Example 5*

For therapeutical use the new pharmacologically active methyl O-piperonyloyl-reserpate and its salts may be made up into pharmaceutical compositions which comprise it together with a phermaceutical adjuvant as a carrier. The compositions thus provided by the invention may be in any suitable solid or liquid dosage form especially in a form suitable for oral or parenteral administration, e.g. tablets, powder, capsules, pills, solutions, emulsions or suspension, e.g. in the form of ampouled injectable solutions. As pharmaceutical carriers there may be employed materials or mixtures of such which do not react with the new compound and are therapeutically useful. Substances or mixtures thereof, such as water, gelatine, lactose, starch, magnesium stearate, talc, vegetable oils, benzyl alcohol, ascorbic acid, gums, glycols such as propylene glycol or polyalkylene glycol, petroleum jelly, cholesterol, tragacanth, alcohol or others may be employed. The new compositions contain a therapeutically effective amount of the new compound per dosage unit, such as for example from about 0.1 to about 50 parts by weight, advantageously from about 0.1 to about 10 parts by weight of methyl O-piperonyloyl-reserpate. In preparing the novel compositions the new compound is admixed with the pharmaceutical carrier and formulated in the desired dosage unit form according to pharmaceutical practice. The compositions may be sterilized and may contain auxiliary substances such as preservative, stabilizing, wetting or emulsifying substances, salts for the control of the osmotic pressure or buffer substances or besides the new compound other therapeutically active substances, for example such as are used in combination with reserpine.

As therapeutically active substances which may be present in the compositions, there may be mentioned other hypotensive active substances, such as ganglionic blockers, e.g. N,N,N′,N′-3-pentamethyl-N,N′-diethyl-3-azapentylene-1,5-diamonium dibromide, hexamethylene bis-trimethyl-ammonium bromide, pentamethylene bis-methylpyrrolidinium ditartrate or 2-(2-dimethylaminoethyl)-4,5,6,7-tetrachloroisoindoline dimethochloride; adrenergic blockers, e.g. 2-(N-p-tolyl-N-m-hydroxyphenylaminomethyl)-imidazoline or active derivatives of ergot alkaloids; hydrazino-pyridazines, e.g. 1,4-dihydrazino-phthalazine or 1-hydrazino-phthalazine. There may also be mentioned other sedative active substances such as barbiturates, 3 - ethyl-3-phenyl-2,6-dioxo-piperidine, N - (3 - dimethylaminopropyl)-3-chloro-phenothiazine; central nervous stimulants, such as methyl α-piperidyl-(2) - phenyl-acetate or d,l-α-methyl-phenylethylamine; cholinergic blocking agents such as diethylamino-ethyl α-cyclohexy-α-phenyl-α-hydroxy - acetate methobromide, atropine or diethylaminoethyl 9-xanthene-carboxylate methobromide; or antihistaminics such as 2-[benzyl-(2-dimethylaminoethyl)-amino]-pyridine.

Methyl O-piperonyloyl-reserpate may be made up, for example, into the following compositions:

COMPOSITION A

| | Parts by weight |
|---|---|
| 1. Methyl O-piperonyloyl-reserpate | 0.1 |
| 2. Lactose | 53.4 |
| 3. Gelatine | 1.0 |
| 4. Starch | 40.0 |
| 5. Magnesium stearate | 0.3 |
| 6. Talcum | 5.2 |
| | 100.0 |

In making the tablet, a homogeneous mixture is prepared from 1 to 2, a paste is made with 3 and part of 4. The paste is mixed with 1 and 2 and the remainder of 4 to form a moist homogeneous mass which is then granulated and dried. After this, 5 and 6 are added and the product tableted.

COMPOSITION B

| | Parts by weight |
|---|---|
| 1. Methyl O-piperonyloyl-reserpate | 0.50 |
| 2. Tragacanth BC | 3.00 |
| 3. Lactose | 134.50 |
| 4. Corn starch | 3.75 |
| 5. Talcum | 7.50 |
| 6. Magnesium stearate | 0.75 |
| | 150.00 |

The methyl O-piperonyloyl-reserpate and tragacanth are mixed together and then mixed with the lactose. The resulting mixture is granulated with 3A alcohol 50 percent and passed through a No. 10 screen. It is then dried thoroughly and passed through a No. 16 screen. The granulation is then mixed with the talcum, corn starch and magnesium stearate and the resulting granulation after rescreening tableted into tablets of 0.150 part by weight each.

COMPOSITION C

| | |
|---|---|
| 1. Methyl O - piperonyloyl-reserpate | 0.125 part by weight. |
| 2. Citric acid, anhydrous | 0.125 part by weight. |
| 3. Benzyl alcohol | 1.000 part by volume. |
| 4. Polyethylene glycol 300 special | 5.000 parts by volume. |
| 5. Water for injection to make | 50.000 parts by volume. |

This preparation for injection is obtained by dissolving the methyl O-piperonyloyl-reserpate in the benzyl alcohol, and adding the solution of the citric acid in 1 part by volume of water for injecting. After mixing, the polyethylene glycol is added and the whole mixed well. Water for injection is slowly added to make up a 50 parts by volume solution, which is then filtered through a coarse porosity sintered glass funnel.

What is claimed is:

Methyl O-piperonyloyl-reserpate.

References Cited in the file of this patent

UNITED STATES PATENTS

| 2,752,351 | Schlittler | June 26, 1956 |
| 2,789,113 | Taylor | Apr. 16, 1957 |
| 2,824,874 | Schlittler | Feb. 25, 1958 |

FOREIGN PATENTS

| 744,290 | Great Britain | Feb. 1, 1956 |